United States Patent
Tagg et al.

(10) Patent No.: US 10,278,060 B2
(45) Date of Patent: *Apr. 30, 2019

(54) IDENTITY MANAGEMENT FOR MOBILE DEVICES

(71) Applicant: Truphone Limited, London (GB)

(72) Inventors: James Tagg, Kent (GB); Alistair James Campbell, Kent (GB)

(73) Assignee: Truphone Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,357

(22) Filed: Jun. 12, 2017

(65) Prior Publication Data
US 2017/0280317 A1  Sep. 28, 2017

Related U.S. Application Data

(63) Continuation of application No. 14/981,577, filed on Dec. 28, 2015, now Pat. No. 9,712,994, which is a
(Continued)

(51) Int. Cl.
*H04W 8/18* (2009.01)
*H04W 4/60* (2018.01)
(Continued)

(52) U.S. Cl.
CPC ......... *H04W 8/183* (2013.01); *H04L 61/6054* (2013.01); *H04W 4/60* (2018.02);
(Continued)

(58) Field of Classification Search
CPC ..... H04W 48/18; H04W 48/16; H04W 8/183; H04W 84/045; H04W 48/04; H04W 48/02; H04W 4/003; H04W 88/085; H04W 84/12; H04W 36/24; H04W 88/08; H04W 52/0209; H04W 52/0229; H04W 60/00; H04L 63/101; H04L 45/00; H04L 45/02;
(Continued)

(56) References Cited

U.S. PATENT DOCUMENTS

| | | | | |
|---|---|---|---|---|
| 2007/0129078 A1* | 6/2007 | De Beer | ............... | H04M 15/00 455/445 |
| 2008/0062934 A1* | 3/2008 | Zhao | ..................... | H04W 48/18 370/332 |

(Continued)

*Primary Examiner* — Nizar N Sivji (57) ABSTRACT

A method of managing identities for use in a mobile telecommunications device in a telecommunications network has the following features. The identity management process is triggered and one or more parameters of a currently available mobile telecommunications network detected. An identity database is searched—each record in the identity database comprises an identity and additional identity information for each identity. The additional identity information includes the one or more parameters. The identity management process involves selecting an identity when a first record comprising the one or more parameters detected is found in said searching and modifying an active identity of the mobile telecommunications device to be the selected identity when the active identity is not already the selected identity. This process can be carried out by a subscriber information module of a mobile telecommunications device.

20 Claims, 6 Drawing Sheets

Related U.S. Application Data continuation of application No. 13/151,942, filed on Jun. 2, 2011, now Pat. No. 9,253,630.

(51) Int. Cl.
| | |
|---|---|
| *H04W 8/26* | (2009.01) |
| *H04L 29/12* | (2006.01) |
| *H04W 36/24* | (2009.01) |
| *H04W 60/04* | (2009.01) |
| *H04M 15/00* | (2006.01) |
| *H04M 17/00* | (2006.01) |

(52) U.S. Cl.
CPC ............ *H04W 8/26* (2013.01); *H04M 15/751* (2013.01); *H04M 15/7556* (2013.01); *H04M 17/103* (2013.01); *H04M 2242/30* (2013.01); *H04W 36/24* (2013.01); *H04W 60/04* (2013.01)

(58) Field of Classification Search
CPC .......... H04L 61/6054; H04M 15/7556; H04M 17/103; H04M 2242/30
See application file for complete search history.

(56) References Cited

U.S. PATENT DOCUMENTS

| | | | | |
|---|---|---|---|---|
| 2009/0286535 | A1* | 11/2009 | Buczek | H04L 29/12594 455/433 |
| 2009/0318148 | A1* | 12/2009 | Zinn | H04W 8/183 455/435.2 |
| 2010/0246544 | A1* | 9/2010 | Brisebois | H04W 24/00 370/338 |
| 2011/0021190 | A1* | 1/2011 | Gunaratnam | H04W 48/18 455/433 |

\* cited by examiner

| | IMSI usage parameters | IMSI to be used | Authentication parameters | SMSC to be used | Other parameters such as Roaming List reference |
|---|---|---|---|---|---|
| Record 1 | IMSI usage parameters Default record | IMSI to be used | Authentication parameters | SMSC to be used | Other parameters such as Roaming List reference |
| Record 2 | IMSI usage parameters (first network) | IMSI to be used | Authentication parameters | SMSC to be used | Other parameters such as Roaming List reference |
| Record n | IMSI usage parameters Last record | IMSI to be used | Authentication parameters | SMSC to be used | Other parameters such as Roaming List reference |

Figure 6

IDENTITY MANAGEMENT FOR MOBILE DEVICES

CROSS REFERENCE TO RELATED APPLICATIONS

This application is a continuation application of U.S. application Ser. No. 14/981,577 filed on Dec. 28, 2015. The Ser. No. 14/981,577 application is a continuation application of U.S. application Ser. No. 13/151,942 filed on Jun. 2, 2011. U.S. application Ser. No. 13/151,942 issued as U.S. Pat. No. 9,253,630 on Feb. 2, 2016.

FIELD OF THE INVENTION

The invention relates to telecommunications, and specifically to the management of identity in mobile devices attaching to telecommunications networks.

BACKGROUND TO THE INVENTION

A primary customer identity is usually a unique human being but can be a machine, or sometimes a company entity such as a department. On a telecommunications network itself, identity is represented by one or more identifiers recognized by elements of, or attached to, the network. In the context of mobile telecommunications, such identifiers are commonly the customers IMSI (International Mobile Subscriber Identity) that resides on a SIM (Subscriber Identity Module), a telephone number MSISDN (Mobile Subscriber Integrated Services Digital Network Number), or other important identities such as MAC (Media Access Control) address, IP address, email address and IMEI (International Mobile Equipment Identity).

In the GSM (Global System for Mobile communication) authentication is performed using a SIM inserted into the mobile communications device. This manages the connection to the network as well as the user identity and the network subscriber keys. There are two types of network service—home service and roaming service.

'Roaming' refers to extending the connectivity of a service to a location that is different from a home location. When a mobile communications device, such as a mobile telephone, travels with a user outside of their home operator coverage area—'territory'—the device can still access services using roaming mechanisms/services. However, there are a growing number of people who live in more than one home and, of course, machines such as airplanes and cars don't have a 'home' in the human sense of the word. Such users are poorly served by current systems.

Another problem travelers experience as they travel near country or region borders is that mobile phones may inadvertently attach to a foreign network, even though they may be physically in a home territory. Under normal operation, once a handset (i.e. a mobile phone) is attached to a network, it remains attached to it until signal is lost or if the subscriber manually disconnects. As a result, the user is charged high roaming charges for an extended period even if though they were physically in their home territory. In some regions such as Canada, USA and India where there is national roaming this effect can lead to accidentally high bills even when the customer is not travelling at all.

There are few options available to users when travelling which help reduce these surcharges:

One option for a user is to purchase a plurality of additional pre-pay subscriber identification modules (SIMs), one for each territory which the user visits. A SIM is a plastic card with embedded electronic circuitry, which has a unique serial number and an international number for the mobile user (IMSI). The SIM enables communication between the mobile device and available cellular networks. Therefore, by purchasing a plurality of different SIMs,—one for each territory—the user is able to replace the original SIM with an appropriate SIM for the territory being visited. In this way, the mobile device appears to be a subscriber of the foreign network, which means the user can make and receive calls or use data services without incurring roaming surcharges.

This option has many disadvantages:
- the user must purchase and carry around a plurality of different SIM cards;
- the user must ensure that there is sufficient credit in the accounts linked with each SIM card. Furthermore, it is not desirable to have unused credit on a number of different networks, as this credit may be wasted without being redeemed;
- The act of maintaining a plurality of different SIM accounts is cumbersome and time consuming, involving considerable user interaction;
- When the Subscriber swaps SIM their mobile number changes this means they are no longer reachable on their normally used number. Further if they make an outbound call their Caller Line Identifier (CLI) will be a new one and therefore unknown to the receiver. This may result in the called party refusing to answer that call as they do not recognize the caller.
- Law enforcement agencies are frustrated in their endeavors to keep track of undesirable people as they effectively have to keep track of multiple copies of the same person.

There are attempts in the prior art to address at least some of these problems.

WO2006/002951 (Brunnekreef) relates to an approach in which the user (or an application) on the mobile phone can pre-pend a (sometimes hidden) telephone number of an intermediate service that will accept the user's call, remove the pre-pended information and call the desired destination number. The caller then drops the call automatically and awaits a call-back. The intermediate service calls the user back to complete the connection, and this may give the user better calling rates than normal roaming surcharges. This has the disadvantage of introducing a delay in the communication channel while the user is trying to contact another party. Furthermore, the user gets a very poor user experience due to handset software compatibility issues: depending on the model of the mobile phone, the phone may appear to 'do nothing' until it gets the call back, strange messages such as 'call failed' or 'call blocked' may appear or the service may not work at all.

Another prior art approach is to have a mechanical device that includes a flexible strip (often called a slim SIM). This device physically connects multiple SIMs to a handset, and can be used with a means of switching between the SIMs. This device requires there to be some spare space within the handset to store the additional SIMs, and this solution is problematic to implement if the SIMs are not compatible with each other (e.g. use different data speeds or voltages). Alternately the Images of all but one SIM can be cloned onto the SlimSIM chip and a remaining SIM used—a one plus many clones solution. Again the physical form factor is incompatible with many handsets and the cloning of SIMs is unlawful in many countries and breaks contracts in almost all cases.

Multi-IMSI SIMs are available that offer the capability of being pre-programmed with a plurality of mobile subscriber data sets. The data sets are sometimes incorrectly referred to as IMSIs, hence the name 'multi-IMSI SIM', but are actually data sets which each comprise an international mobile subscriber identity (IMSI) and other network-related data. These SIMS have processing capability and an algorithm to present the correct set of data to the phone based on the location of that phone. This allows the phone to present as a 'local' subscriber to the network in question.

Many fixed format Dual and Multiple IMSI SIM systems have been sold by companies such a as VeriSign, Gemalto □and these are described in various patent applications such as Cammileri (WO2007102003), Stadelmann (WO9955107), Salomon (WO0221872), Bongers (WO0049820). In such systems, a piece of software runs in the SIM or on the handset or a separate electronic module and makes decisions as to which IMSI to use given the location and available networks. Such systems are sometimes called SmartSIMs, but in fact this is a misnomer as all SIMs are smart and contain a microprocessor and memory to run network selection and authentication programs.

Such systems are however typically relatively inflexible to changes in network availability over time and require informed decision making from users. This can result in failures of operation and poor network choices.

An improved system is disclosed in the applicant's earlier WO 2011/036484. This discloses a system in which a central service—an "IMSI Broker"—is adapted to provision the SIM of a mobile handset with new identities as required. While this approach addresses certain problems of the prior art, it does not in itself solve the problem of making reliable and effective choices of identity at the mobile handset.

SUMMARY OF INVENTION

In a first aspect, the invention provides a method of managing identities for use in a mobile telecommunications device in a telecommunications network, the method comprising: triggering an identity management process; detecting one or more parameters of a currently available mobile telecommunications network; in the identity management process, searching an identity database wherein each record comprises an identity and additional identity information for each identity, wherein the additional identity information includes the one or more parameters; in the identity management process, selecting an identity when a first record comprising the one or more parameters detected is found in said searching; and in the identity management process, modifying an active identity of the mobile telecommunications device to be the selected identity when the active identity is not already the selected identity.

This approach provides a highly effective method of managing identities. This method is robust and allows good identity choices to be made in a reliable way.

Preferably, each said identity comprises an IMSI. The said one or more parameters of a mobile telecommunications network may comprise a Mobile Country Code (MCC) and an Mobile Network Code (MNC). Selecting an identity advantageously comprises searching through an ordered list in the identity database to find a first entry in which the MCC and the MNC match the MCC and MNC detected, and selecting the identity of said first entry. If there is no entry in which the MCC and the MNC match the MCC and MNC detected, selecting an identity may then comprise selecting a first entry in which the MCC matches the MCC detected, and selecting the identity of said first entry. If there is no entry in which the MCC matches the MCC detected, a default identity may be selected.

The one or more parameters may be disclosed in a triggering event.

In a further aspect, the invention provides a subscriber identity module for use in a mobile telecommunications device and having a plurality of identities for use in a mobile telecommunications network, the subscriber identity module comprising a memory and a processor, wherein the memory comprises an identity management process for execution by the processor and an identity database, wherein the processor is adapted to: on triggering, initiate the identity management process; detect one or more parameters of a currently available mobile telecommunications network; in the identity management process, search the identity database wherein each record comprises an identity and additional identity information for each identity, wherein the additional identity information includes the one or more parameters; in the identity management process, select an identity when a first record comprising the one or more parameters detected is found in said searching; and in the identity management process, modify an active identity of the mobile telecommunications device to be the selected identity when the active identity is not already the selected identity.

In a further aspect, the invention provides a method of managing identities for use in a mobile telecommunications device in a telecommunications network, the method comprising the steps of triggering an identity management process; detecting one or more parameters of a currently available mobile telecommunications network; in the identity management process, searching an identity database wherein each record comprises an identity and additional identity information for each identity, wherein the additional identity information includes the one or more parameters; in the identity management process, selecting an identity when a first record comprising the one or more parameters detected is found in said searching; and in the identity management process, modifying an active identity of the mobile telecommunications device to be the selected identity when the active identity is not already the selected identity.

In a further aspect, the invention provides a method as recited above, wherein each said identity comprises an IMSI.

In a further aspect, the invention provides a method as recited above, wherein said one or more parameters of a mobile telecommunications network comprise an MCC and an MNC.

In a further aspect, the invention provides a method as recited above wherein selecting an identity comprises searching through an ordered list in the identity database to find a first entry in which the MCC and the MNC match the MCC and MNC detected, and selecting the identity of said first entry.

In a further aspect, the invention provides a method as recited above wherein selecting an identity further comprises, if there is no entry in which the MCC and the MNC match the MCC and MNC detected, selecting a first entry in which the MCC matches the MCC detected, and selecting the identity of said first entry.

In a further aspect, the invention provides a method as recited above comprising if there is no entry in which the MCC matches the MCC detected, selecting a default identity.

In a further aspect, the invention provides a method as recited above wherein the one or more parameters are disclosed in a triggering event.

In a further aspect, the invention provides a subscriber identity module for use in a mobile telecommunications device and having a plurality of identities for use in a mobile telecommunications network, the subscriber identity module comprising a memory and a processor, wherein the memory comprises an identity management process for execution by the processor and an identity database, wherein the processor is adapted to: on triggering, initiate the identity management process; detect one or more parameters of a currently available mobile telecommunications network; in the identity management process, search the identity database wherein each record comprises an identity and additional identity information for each identity, wherein the additional identity information includes the one or more parameters; in the identity management process, select an identity when a first record comprising the one or more parameters detected is found in said searching; and in the identity management process, modify an active identity of the mobile telecommunications device to be the selected identity when the active identity is not already the selected identity.

In a further aspect, the invention provides a module as recited above wherein each of the plurality of identities are IMSIs.

In a further aspect, the invention provides a module as recited above wherein each record in the identity database comprises an IMSI and an MCC and an MNC for that IMSI.

In a further aspect, the invention provides a module as recited above wherein the identity database comprises a plurality of records with the same MCC.

Advantageously, each of the plurality of identities are IMSIs, and each record in the identity database comprises an IMSI and an MCC and an MNC for that IMSI. The identity database may comprise a plurality of records with the same MCC.

BRIEF DESCRIPTION OF DRAWINGS

Specific embodiments of the invention will be described below, by way of example, with reference to the accompanying drawings, of which.

DETAILED DESCRIPTION OF PREFERRED EMBODIMENTS

Figure 1:
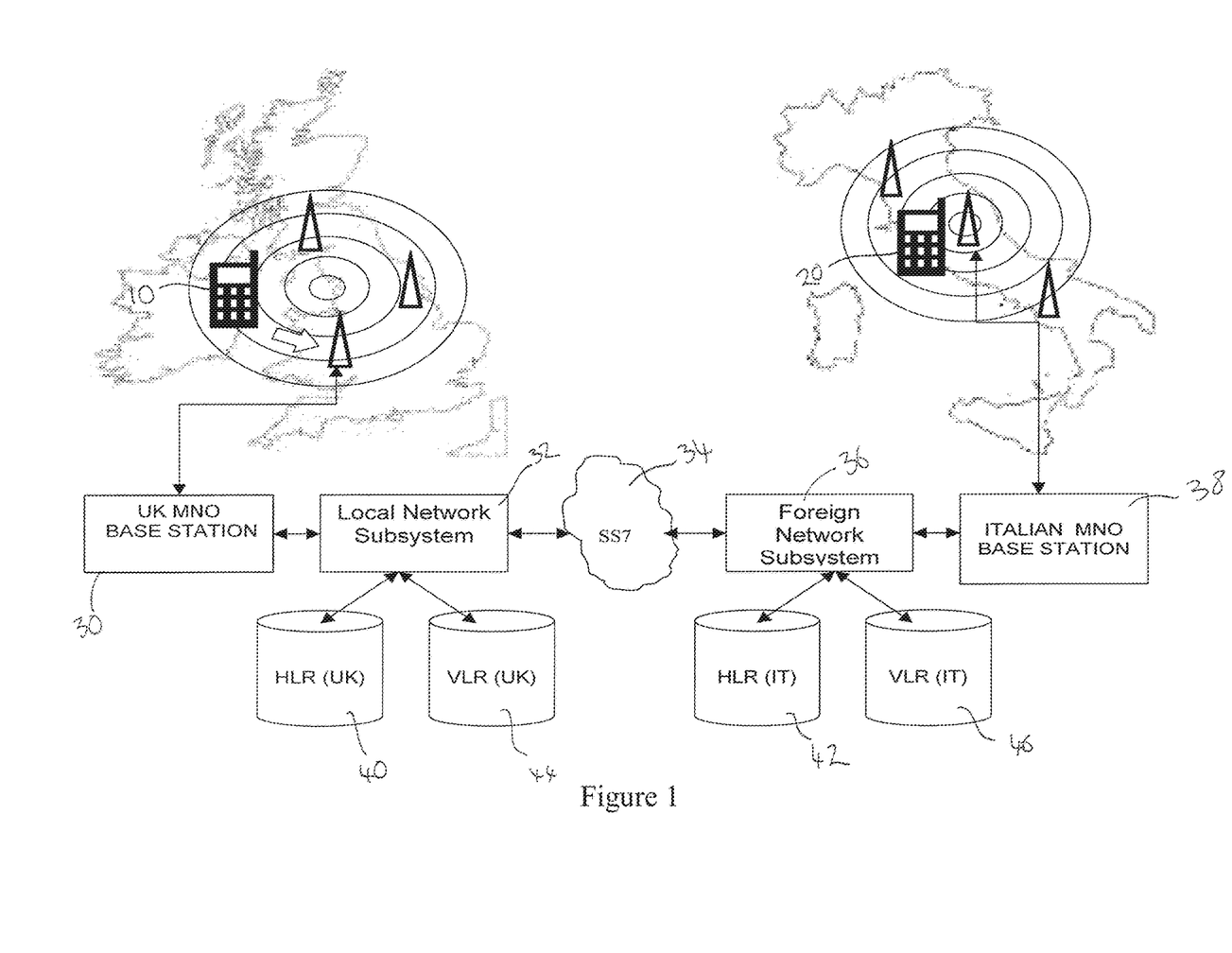
FIG. 1 is an overview of a conventional communications system in which aspects of the present invention can operate.

FIG. 1 provides a schematic representation of two cellular telecommunications networks, one in the UK and one in Italy, to indicate the general roaming problem addressed by embodiments of the invention. In reality there are many more Mobile Network Operators (MNO), Mobile Virtual Network Operators (MVNO) or Mobile Virtual Network Enablers (MVNE), and as such many more cellular telecommunications networks. However, FIG. 1 represents only two networks for simplicity.

When a first user makes a call from a first mobile phone 10 in the first user's local network, for example, in the UK, to a second user 20 in a foreign network (i.e. Italy), the call is routed through the local network's base station subsystem (BSS) 30 to a local network switching subsystem (local-NSS) 32, the call is then routed through the Signaling System Number 7 (SS7) 34 network to the foreign network, and through a foreign network switching subsystem (foreign-NSS) 36 to the foreign network's base station subsystem 38. The call is finally routed to the second user's mobile phone 20. Calls in the opposite direction are routed in the same way, through the foreign network's base station subsystem, to the foreign network switching subsystem 36, through SS7 34 to the local network switching subsystem (local-NSS) 32, on to the local network's base station subsystem (BSS) 30, and finally to the first mobile phone 10.

The way that the call is routed to the correct recipient is through a plurality of location registers which form part of the network subsystems. For every user registered in a particular cellular telecommunications network, there is a record held in that network's Home Location Register (HLR) 40, 42. The HLR 40, 42 is a central database that contains details of each mobile phone subscriber that is authorized to use that particular network.

The HLR stores details of every Subscriber Identity Module (SIM) card issued by the mobile phone operator (i.e. MNO, MVNO or MVNE). A SIM is a plastic card with embedded electronic circuitry, which is inserted into the mobile phone. Each SIM has a unique identifier called an International Mobile Subscriber Identity (IMSI) which is a primary key to each HLR record. IMSIs are used in any mobile network that interconnects with other networks, including CDMA and EVDO networks as well as GSM networks.

An IMSI is usually 15 digits long, but there are some exceptions. Typically the first 3 digits are the Mobile Country Code (MCC), followed by the Mobile Network Code (MNC), (either 2 digits (European standard) or 3 digits (North American standard)). The remaining digits contain a mobile station identification number (MSIN) within the network's customer base.

SIMs also comprise one or more MSISDNs, which are the telephone numbers used by mobile phones to make and receive calls. Each MSISDN is also a primary key to the HLR record.

In summary, there is a relationship between the HLR, MSISDN, IMSI, and the SIM. The SIM is the physical device which contains a record of the IMSI. The MSISDN is the unique number identifying the mobile phone. The IMSI is the unique identifier of the user subscribing to the network, and the HLR is the system that maps MSISDNs to IMSIs and vice versa.

The above holds true when a user 'roams' away from their home/local network to a foreign network also called a roamed-to network. However, when a mobile phone attempts to connect to a network which is not the home/local network, the roamed-to network communications with the home network in order to verify whether the mobile phone is authorized to use the roamed-to network. This communication is possible because there are reciprocal agreements between many of the available network operators.

When a user roams away from their home service and into an area served by another operator, messages are exchanged over the SS7 network and the roamed-to network operator obtains information from the home network's HLR and creates a temporary record for the subscriber in its Visitor Location Register (VLR) 44, 46. The VLR is a database which is maintained by a network operator (in the same way as the HLR is maintained). However, the VLR of the Mobile Switching Center (MSC) contains temporary information about mobile users that are currently located within the service area of that MSC. When calls are made from the mobile phone, the VLR is checked for authorization, and assuming authorization is permitted, the Mobile Switching Center (MSC) permits tracking of the use of the mobile phone for billing purposes. The HLR subscriber profile (i.e. which services are allowed) is downloaded to the VLR when subscribed user registers on (connects to) the network (same for roaming and home network). All call handling and billing related call data record (CDR) generation is done by the MSC—the HLR is not involved.

So using the example in FIG. 1, a user subscribed to a mobile network operator in the UK visits Italy. When the user arrives in Italy and turns on the mobile phone, the mobile phone will try to connect to an available Italian network operator 36. The Italian network operator can identify from the IMSI number stored in the SIM card that the user is not subscribed to the Italian network, and as such, will contact the user's home network 32 in the UK to verify whether the user is authorized to use the Italian network.

The VLR 46 updates the HLR 40 in the UK, with location information over SS7 with a Location Update message (LU). The LU message is routed to the HLR(UK) based on the global title translation of the IMSI that is contained in a Signaling Connection Control Part (SCCP) field of the LU. The HLR(UK) informs the VLR(IT) as to the status of the subscriber and whether service is to be provided in the roamed-to network, i.e. the Italian network. If the user is authorized, the Italian network generates a temporary record for the user in the Italian VLR 46.

As described above, there are problems associated with roaming services in that users connected to a roamed-to network incur heavy surcharges when making or receiving calls or using data services on their mobile phones. This is true regardless of where the user is calling, or who is calling the user. In the above example, the user visiting Italy will incur roaming charges when calling local Italian phone numbers as well as calling phones in the home network in the UK and elsewhere. Similarly, roaming charges will be applied to incoming calls from either UK, Italian or other phone numbers.

The prior art methods for reducing these roaming charges are cumbersome as they require the user to purchase, carry around, and maintain the accounts of, many different SIM cards, or they require a high degree of user interaction in order to utilize one of the services to circumvent these roaming charges. However, as described above there are many known problems with these services.

As described above, WO 2011/036484, the disclosure of which is incorporated by reference herein to the extent permitted by law, provides an additional central server within a typical cellular telecommunications network. The additional central server is able to provide, as required, a plurality of additional IMSIs to a mobile phone, when the mobile phone is connected to a roamed-to network in another country/region. The additional central server is referred to as an IMSI Broker. In such a system, the IMSI Broker is arranged to determine whether the SIM card in the mobile phone has an appropriate IMSI for the roamed-to network. The SIM cards required for this embodiment of the invention are capable of storing a plurality of alternative IMSIs for different networks, together with associated rules governing when the alternative IMSIs should be used. In this embodiment, the IMSI broker has access to a database store of alternative (new) IMSIs for multiple foreign networks (FNOs) and is arranged to distribute these new IMSIs as necessary to users who are subscribed to a network comprising an IMSI broker and, who are roaming across networks.

In this arrangement, each SIM has the capability of storing a plurality of IMSIs that can be used in a specific territory (country or region) to achieve the best possible calling rates. The SIM also has a set of rules to drive the selection of the best possible IMSI. Every time a user enters a different territory (mostly a new country, but it could also be a new region within a country), the IMSI Broker will issue the best possible IMSI and IMSI selection rules for that territory. The IMSI Broker will send this new IMSI to the SIM via Over The Air (OTA). This solution eliminates the need to swap out SIMs when new wholesale network deals become available. Subscribers are issued an additional IMSI when and where available.

Updates and management of the data in the SIM can be achieved over the air interface using any available OTA radio connection. Some examples, include but are not limited to, cellular signaling channels, cellular data connections, text messaging, WiFi, Bluetooth & WiMAX. A person skilled in the art will appreciate that 'OTA' shall include all possible connections to the mobile handset and any other method of transferring data to the handset device such as wired connection to a PC, Infra-Red and so on.

Using this approach, the SIM may, at the time of manufacture, be programmed to include a plurality of IMSIs corresponding to popular destinations. In another embodiment, the SIM may be programmed with a plurality of IMSIs at registration with the network, in accordance with user selection of countries or territories to which the user expects to visit in the future. In another embodiment, the SIM may only comprise one IMSI after manufacture and registration, such that all of the new/alternative IMSIs are delivered from the IMSI Broker as and when the user visits new countries/territories.

SIMs are evolving continuously, and currently known SIMs may be capable of storing up to 256 different IMSIs in the SIM's memory. This number is likely to increase further. However, regardless of the number of IMSIs that the SIM is able to hold, other memory constraints may mean that an upper limit is placed on the number of IMSIs to be stored within the SIM. In cases where an upper limit is reached, according to one embodiment of the present invention, the SIM is able to dynamically overwrite a stored IMSI with a newly obtained IMSI. The decision as to which IMSI is overwritten can be based on a number of factors, for example, any unused IMSI may be the first to be overwritten. Likewise IMSIs that have been used the least, or which have been used less frequently may be overwritten before more popular/recently used IMSIs.

While embodiments of the present invention may be used effectively with the IMSI Broker described here, and in more detail in WO 2011/036484, the IMSI Broker is not itself an aspect or feature of the present invention, which is directed to management of identity at a mobile device.

Figure 2:
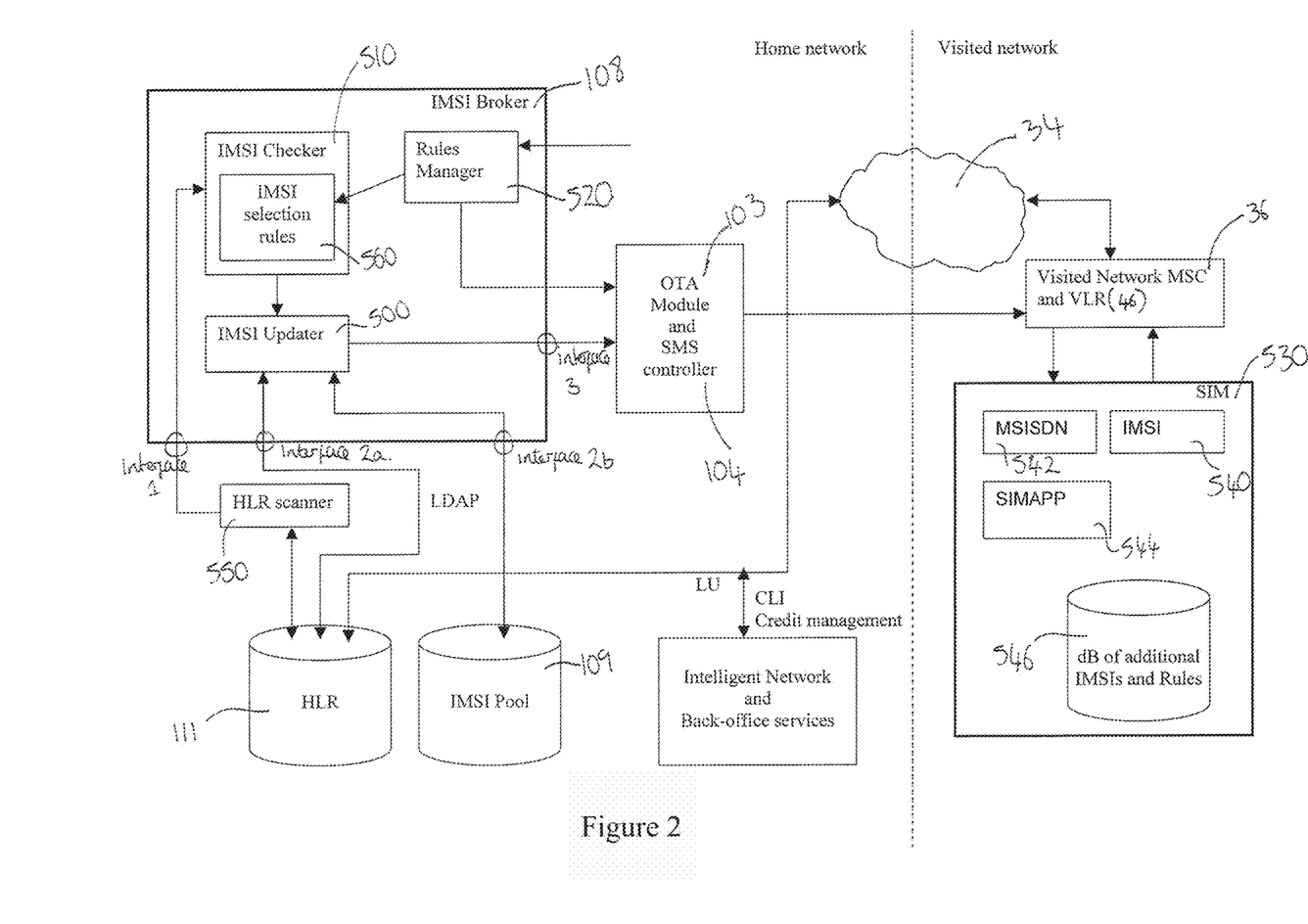
FIG. 2 is a functional block diagram of a system in which identities may be provided by a central service, and also show the elements of a SIM in accordance with embodiments of the invention.

FIG. 2 shows a schematic overview of an integrated IMSI Broker 108 and a handset SIM 530 in communication with it over a network. In this sense, network need not be limited to the physical network which is operated by a single network operator. In other words, the term network may be taken to mean a collection of co-existing networks.

The MSC of a network communicates with the HLR 111, which in turn communicates with the IMSI Broker 108 and an Intelligent Network (IN) Back-office Services system (BSS) module 113. The IN/BSS module has access to a user dB which comprises a record for each user subscribed to the network. The IN/BSS module 113 is responsible for monitoring the user's usage, i.e. voice calls, SMSs, data usage etc, such that a record is kept for billing purposes. In one embodiment, the IN module 113 is also responsible for ensuring that caller ID information, also known as Caller Line Identification (CLI), is stored and provided during calls while roaming, to ensure that there is transparency for the called parties.

The IMSI Broker 108 has access to an IMSI Pool 109, which is a database comprising a plurality of available IMSIs for different territories/locations. IMSIs by their nature are territory specific. They are both country specific, and may also be region specific in countries (i.e. USA, India) where there may be surcharges for regional roaming as well as international roaming. An IMSI which is registered on an HLR in one territory will be deemed to be roaming if connected to a network/HLR in a different territory. Therefore, for each territory in the IMSI Pool 109 there is a sub-pool or range of suitable IMSIs which may be used. This is described in more detail later.

The IMSI Broker 108 comprises an IMSI updater 500, and IMSI checker 510, and a rules manager 520.

The network also comprises an OTA module which is arranged to send update messages to mobile phones as necessary. The update messages may include alternative IMSIs and/or rule update messages. This updating mechanism is not limited to provision of alternative IMSIs or associated rules—it may also be used to provide other updates to the SIM card (such as new versions of installed software) and also for verification of settings.

The HLR is further arranged to communicate with a plurality of foreign networks (operated by foreign network operators FNOs). The communication channel between the HLR and foreign networks is through the SS7 network.

FIG. 2 also comprises a schematic block diagram of the functional components within the SIM 530. As shown the SIM comprises a current IMSI 540, a current MSISDN 542, a SIM application (SIMAPP) 544 for executing functional steps on the SIM, and a database 546 of available IMSIs, associated rules, and MSISDNs.

The skilled person will review WO 2011/036484 for further details of the IMSI Broker system, as required. Embodiments of the present invention will now be described with reference to a SIM of the type illustrated in FIG. 2—as indicated above, such a SIM may or may not be used in connection with an IMSI Broker system as indicated here, or may be used independently of such a system (or with a different type of system for providing user identities where required).

In one aspect, aspects of the invention involve automatic modification of a telecommunications network identity and configuration stored in a subscriber identity module for a specific user, wherein:
 a) the method is triggered by an event,
 b) the method has a means to detect information related to the mobile network(s) that are available to the mobile equipment,
 c) the method has a means to detect selected properties from the handset,
 d) the method has means to detect information about the current subscriber subscription,
 e) the method has a set of rules to determine the correct subscription parameters from a plurality of possible values,
 f) the method has the means to modify the subscriber identity,
 g) the method has a means to make the mobile equipment use the updated parameters.

This approach can be used on different types of telecommunications network, but is effective on a GSM network, or on a 3G or LTE network as specified by 3GPP. The SIM may be a conventional SIM, or may be a USIM running on a smart card running on a 3G Phone—the term "SIM" will be used hereafter for all types of SIM, whether embodied as a SIM card, an application on a smart card, or a routine instantiated virtually. Advantageously, such a SIM is designed and implemented according to currently applicable standards (at the present time, such standards include ETSI TS 151.011, ETSI TS 131 101, ETSI TS 102 221, ETSI TS 131 102, ETSI TS 131 111 and ETSI TS 151 014) and application and other additional files are provided with the SIM to enable implementation of the relevant aspects of the invention.

Figure 3:
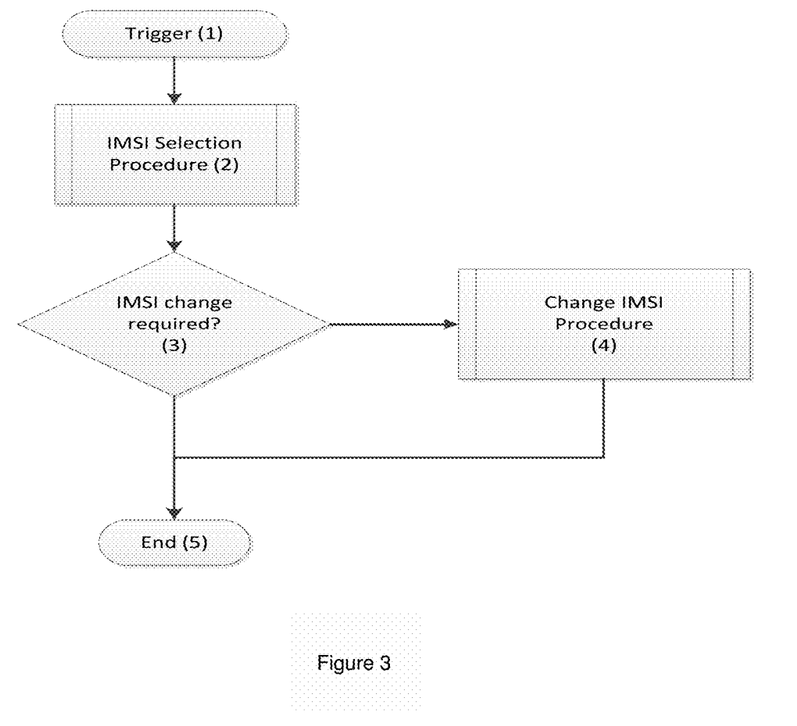
FIG. 3 shows elements of an identity management process in accordance with one aspect of the invention.

FIG. 3 shows that three main stages are present in a process operated according to an embodiment of the invention. These are a trigger step 1, an identity selection step 2 and an identity swap step 3, 4. The identity selected and swapped is in this case an IMSI—the approach shown here may however be applied to the selection and swapping of other identity types.

Figure 4:
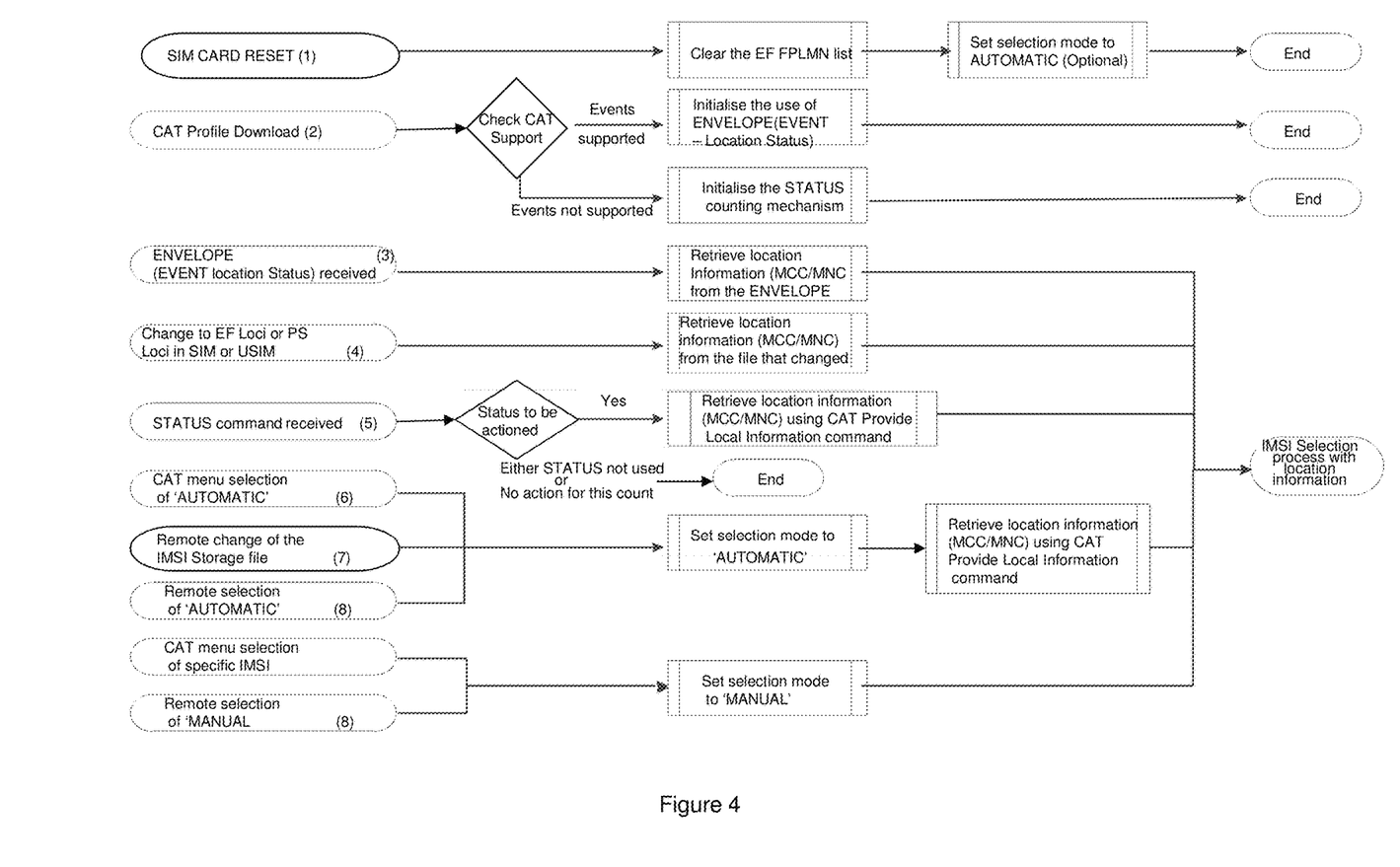
FIG. 4 illustrates different possible trigger steps in the process of FIG. 3, and their consequences.

FIG. 4 illustrates different possible trigger steps and their consequences. In embodiments, any of the following events can trigger further operation of the application:
 The (U)SIM coming out of RESET
 A SIM or card application toolkit profile download received by the (U)SIM.
 A SIM or card application toolkit EVENT (Location Status)
 A change to the contents of the EF Loci in DF GSM (specified in ETSI TS 151.011)
 A change to the contents of the EF PS_Loci in DF GSM (specified in ETSI TS 151.011)
 A change to the contents of the EF Loci in ADF USIM (specified in ETSI TS 131 102)
 A change to the contents of the EF PS_Loci in ADF USIM (specified in ETSI TS 131.102)
 A STATUS command is received by the (U)SIM.
 A SIM or card application toolkit menu selection of a specific IMSI.
 A SIM or card application toolkit menu selection of an automatic IMSI.
 A change to the IMSI storage file used by the application by a message from a remote service (this may be from the home network, for example from an IMSI Broker).
 An instruction to change IMSI to a specific IMSI from a remote service (this may be from the home network, for example from an IMSI Broker).
 An instruction to change the IMSI selection mode to 'AUTOMATIC' from a remote service.

If the trigger is the (U)SIM coming out of RESET, then the application shall initialize itself. As part of this initialization the SIM shall remove all networks from the forbidden list (defined in ETSI TS 151 011 and ETSI TS 102 221) before the handset reads this file. Optionally if the IMSI selection mode is set to 'MANUAL' then the IMSI selection mode may be changed to 'AUTOMATIC'.

If the trigger is the (U)SIM receiving a SIM or card application toolkit profile download, then the application shall analyze the contents of the Profile download to determine the level of support the handset has for different aspects of the application function. If the handset supports the SIM or Card application toolkit EVENT (Location Status) then it shall use incoming events to trigger IMSI changes else it shall monitor changes in the (U)SIM files and STATUS commands to trigger IMSI changes.

If the trigger is a SIM or card application toolkit EVENT (Location Status), then the application shall retrieve the data supplied in the EVENT message and then follow the IMSI selection procedure.

If the trigger is change to the contents of the one or more of:
EF Loci in DF GSM (specified in ETSI TS 151.011)
EF PS_Loci in DF GSM (specified in ETSI TS 151.011)
EF Loci in ADF USIM (specified in ETSI TS 131 102)
EF PS_Loci in ADF USIM (specified in ETSI TS 131.102)

then the application shall read the file that has changed to determine the network connection status and the MCC and MNC of the current network (if available). It will then follow the IMSI selection procedure.

If the trigger is a STATUS command is received by the (U)SIM, then the application shall decide whether this STATUS command shall be used as a trigger. This may be decided based on the number of STATUS commands received or by some other means. If triggered by the STATUS command, the application shall use the PROVIDE LOCAL INFORMATION (cell id) to determine the network connection status and the MCC and MNC of the current network (if available). It will then follow the IMSI selection procedure.

If the trigger is a change to the IMSI storage file used by the application or a SIM or card application toolkit menu selection of an automatic IMSI, or a message from a remote service (IMSI Broker) to go into 'AUTOMATIC' mode, then the application shall use the PROVIDE LOCAL INFORMATION (cell id) to determine the network connection status and the MCC and MNC of the current network (if available). It will set the IMSI selection mode to 'AUTOMATIC' and then follow the IMSI selection procedure.

If the trigger is the selection of a specific IMSI either by the card application toolkit menu or due a message from a remote service (IMSI Broker) then the IMSI selection mode shall be set to 'MANUAL' and the IMSI swap process shall be followed using the specified IMSI.

Figure 5:
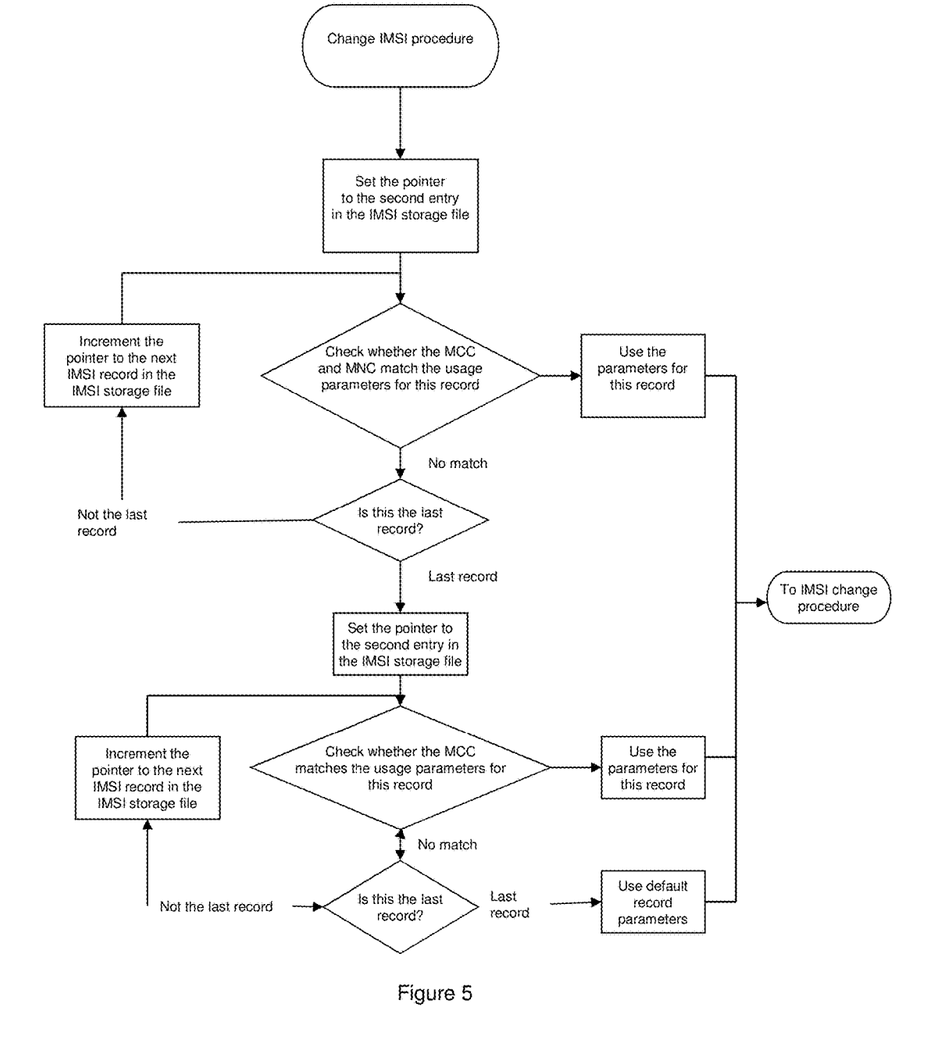
FIG. 5 illustrates an IMSI selection procedure for use in the process of FIG. 3.

The IMSI selection procedure used in embodiments of the invention is shown in FIG. 5. On entry to the IMSI selection procedure the MCC and MNC of a current network is known (as has been indicated above from the description of the triggering events). A handset will in any event be configured to determine the MCC and MNC of a currently available network through a conventional network scan.

Figure 6:
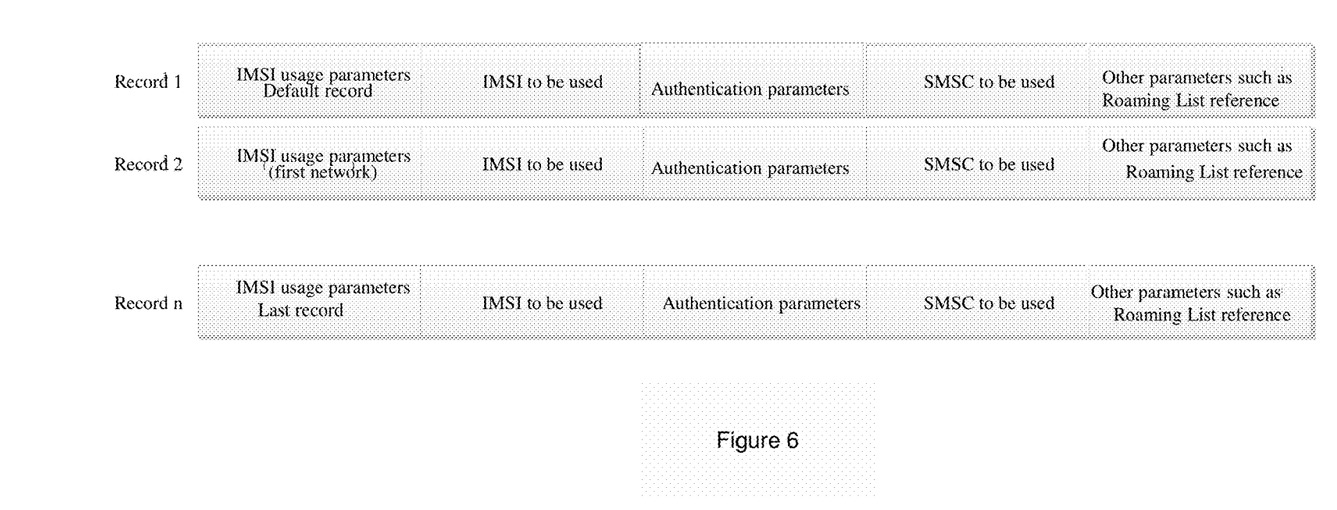
FIG. 6 illustrates an IMSI storage file used in the procedure of FIG. 5.

To select the correct IMSI to use, the application first compares both the MCC and MNC to the usage parameters for each IMSI in the IMSI storage file. This is done in order starting at the first entry. The IMSI storage format for this embodiment is in FIG. 6.

If the application finds a match, then the corresponding IMSI and associated parameters are of the first match found are used by the Change IMSI process described below.

If no match is found, then the application compares only the MCC to the usage parameters for each IMSI in the IMSI storage file. This is again done in order, starting at the first entry.

If the application now finds a match, then the corresponding IMSI and associated parameters of this first match are used by the Change IMSI process.

If no match is found, then a default IMSI and associated parameters are used by the Change IMSI process. The Default IMSI is the first entry of the IMSI storage file.

Returning to FIG. 3, the Change IMSI process to allow IMSIs to be swapped is carried out as follows.

On entry into the IMSI swap procedure the application first checks whether the new IMSI to be selected is the same as the existing IMSI being used.

If it is the same, then the application exits without making any change to the IMSI and its associated parameters.

If it is different, then the Change IMSI procedure is actioned as follows:

The application uses the card application toolkit REFRESH command to reset the GSM/3G/LTE session and to inform the handset that the following files have changed. If the handset does not support this command or rejects this command then the application requests that the user switches the handset off and on using the card application toolkit DISPLAY TEXT command.

When the UICC restarts, either due to the REFRESH or the next switch on, the application changes the following before the handset reads them:
EF IMSI in DF GSM and ADF USIM are set the new IMSI.
EF SMSP is changed to the SMSC value relevant to the new IMSI (optional).
EF OPLMNwACT is changed to the correct content relevant to the new IMSI (optional).
The authentication parameters are set to the relevant values for the new IMSI (optional).
The EF LOCI and EF PS_LOCI in DF_GSM and ADF USIM are set to their initial provisioned value.

The modification of identity may include the modification of one or more of the following files in the SIM: EF LOCI, EF PS_LOCI, EF GPRS_LOCI, EF OPLMNwACT, EF PLMNwACT, EF HPLMNwACT, EF PLMNsel, EF FPLMN and EF HPPLMN.

This approach allows for reliable management of identity at a mobile handset—while described here with reference to IMSI data, it is also applicable to other types of identity for use with a communication network. This approach is also effectively used in combination with an IMSI Broker as discussed in WO 2011/036484, which can dynamically provide new identities and supporting information and parameters to a mobile handset, and which can also be a source of trigger events to prompt a change of IMSI where this is determined to be desirable.

The operational data contained in a database record of IMSI data may optionally contain primary data or links or pointers, optionally nested, to additional operational data contained other SIM database files.

The SIM database may optionally be pre-loaded at manufacture, or modified by OTA information sent from the host system.

The term territory used herein is intended to mean any specific locality, this may be in terms of countries, regions and possible even for given networks.

The terms mobile phone, handset, mobile terminal, communications device may be considered as being interchangeable within this document.

A person skilled in the art will appreciate that the present invention is not limited to details of the described embodiments, rather numerous changes and modifications may be made without departing from the spirit and scope of the invention as set out in the appended claims.

The invention claimed is:

1. A method of managing identities used in a mobile communications device, the method comprising:
   scanning available telecommunications networks at the location of a mobile communications device,
   detecting a parameter of at least one available telecommunications network,
   searching a database of at least one record comprising an identity and additional identity information comprising a parameter,
   selecting an identity from the database when the additional identity information parameter in the record containing the identity matches the detected parameter,
   changing the active identity of the mobile communications device to the selected identity, said selected identity identifying the mobile communications device to a telecommunications network; and
   authenticating the mobile communications device on a telecommunications network with the selected identity.

2. A method as claimed in claim 1, wherein the additional identity information of the at least one record further comprises an authentication parameter.

3. A method as claimed in claim 2, wherein the authenticating of the mobile communications device uses the authentication parameter in the record of the selected identity.

4. A method as claimed in claim 3, wherein the identity comprises an International Mobile Subscriber Identity (IMSI).

5. The method as claimed in claim 4, wherein the mobile communications device further comprises a Subscriber Identity Module (SIM).

6. A method as claimed in claim 5, wherein the parameter comprises a Mobile Country Code (MCC).

7. A method as claimed in claim 5, wherein the parameter comprises a Mobile Network Code (MNC).

8. The method as claimed in claim 5, wherein the method is initiated by a change to the content of the location information file in the Subscriber Identity Module (SIM).

9. The method as claimed in claim 1, wherein the method is initiated by a triggering event.

10. The method as claimed in claim 9, wherein the triggering event is the mobile communications device receiving an update message comprising an alternative identity.

11. A device for managing the identities used in a mobile communications device comprising:
    a network scanner,
    a memory for storing a database with at least one record comprising an identity and additional identity information comprising a parameter,
    and a processor adapted to:
    detect a parameter of at least one telecommunications network identified by the network scanner,
    search the database of at least one record comprising an identity and additional identity information comprising a parameter,
    select an identity from the database when the additional identity information parameter in the record containing the identity matches the detected parameter,
    changing the active identity of a mobile communications device to the selected identity, said selected identity identifying the mobile communications device to a telecommunications network; and
    authenticate the mobile communications device on a telecommunications network with the selected identity.

12. A device as claimed in claim 11, wherein the additional identity information of the at least one record further comprises an authentication parameter.

13. A device as claimed in claim 12, wherein the authenticating of the mobile communications device uses the authentication parameter in the record of the selected identity.

14. A device as claimed in claim 13, wherein the identity comprises an International Mobile Subscriber Identity (IMSI).

15. The device as claimed in claim 14, wherein the mobile communications device further comprises a Subscriber Identity Module (SIM).

16. A device as claimed in claim 15, wherein the parameter comprises a Mobile Country Code (MCC).

17. A device as claimed in claim 15, wherein the parameter comprises a Mobile Network Code (MNC).

18. The method as claimed in claim 15, wherein the device is initiated by a change to the content of the location information file in the Subscriber Identity Module (SIM).

19. A device as claimed in claim 11, wherein the device is initiated by a triggering event on the mobile communications device.

20. A device as claimed in claim 19, wherein the triggering event is the mobile communications device receiving an update message comprising an alternative identity.

* * * * *